(12) United States Patent
Hemphill

(10) Patent No.: US 11,434,984 B2
(45) Date of Patent: Sep. 6, 2022

(54) TORSION SPRING USING TENSILE STRESS

(71) Applicant: SCHAEFFLER TECHNOLOGIES AG & CO. KG, Herzogenaurach (DE)

(72) Inventor: Jeffrey Hemphill, Copley, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 983 days.

(21) Appl. No.: 16/173,263

(22) Filed: Oct. 29, 2018

(65) Prior Publication Data

US 2020/0132178 A1 Apr. 30, 2020

(51) Int. Cl.
*F16H 45/02* (2006.01)
*F16F 1/34* (2006.01)
*F16H 45/00* (2006.01)

(52) U.S. Cl.
CPC ............... *F16H 45/02* (2013.01); *F16F 1/34* (2013.01); *F16H 2045/002* (2013.01); *F16H 2045/0263* (2013.01); *F16H 2045/0278* (2013.01)

(58) Field of Classification Search
CPC .............. F16H 45/02; F16H 2045/002; F16H 2045/0263; F16H 2045/0278; F16F 1/34
USPC ......................................................... 464/141
See application file for complete search history.

(56) References Cited

U.S. PATENT DOCUMENTS

| 6,196,332 | B1 * | 3/2001 | Albert | B25B 21/00 173/217 |
| 6,494,303 | B1 | 12/2002 | Reik et al. | |
| 2015/0137437 | A1 * | 5/2015 | Mueller | F16F 15/124 267/141 |
| 2016/0312693 | A1 | 10/2016 | Brevick | |

* cited by examiner

*Primary Examiner* — Mahmoud Gimie

(57) ABSTRACT

A torsion damper includes an input carrier and an output carrier. The input carrier is configured to rotate about an axis and receive an input torque from a prime mover, such as an engine. An output carrier is spaced along the axis from the input carrier and is configured to transfer an output torque to a transmission component. The torsion damper includes two rings, namely a first ring connected to the input carrier and a second ring connected to the output carrier. The first and second rings are spaced apart from one another. A plurality of rolling elements are disposed between and connect the first and second rings. Rotation of the input carrier relative to the output carrier causes the rings to rotate, forcing the first ring to be in compression and the second to be in tension.

19 Claims, 1 Drawing Sheet

TORSION SPRING USING TENSILE STRESS

TECHNICAL FIELD

The present disclosure relates to a torsion spring that uses tensile stress to dampen vibration. In particular embodiments, the present disclosure is directed to a torsional vibration damper (also referred to as a torsion damper) with an input member and an output member capable of undergoing both tension and compression to dampen vibrations.

BACKGROUND

Vehicles equipped with a combustion engine typically include some sort of torsional vibration dampener, or torsion damper. Typical torsion dampers utilize coil springs arranged between plates or flanges; torsion applied to one flange of the damper causes displacement of the springs before being transferred to the other flange. Torsional energy is stored by the damper in the springs when the forcing torque fluctuation is high and returned to the driveline when the forcing torque fluctuation is low.

SUMMARY

According to one embodiment, a torsion damper includes an input carrier configured to rotate about an axis and receive an input torque from a prime mover. An output carrier is spaced along the axis from the input carrier and is configured to transfer an output torque to a transmission component. A first ring is connected to the input carrier. A second ring is connected to the output carrier and is spaced apart from the first ring. A plurality of rolling elements are disposed between and connect the first and second rings. Rotation of the input carrier relative to the output carrier forces the first ring to be in compression and the second to be in tension.

In another embodiment, a torsion damper includes an input carrier configured to rotate about an axis and receive an input torque from a prime mover. An output carrier is spaced along the axis from the input carrier and is configured to transfer an output torque to a transmission component. First and second conical rings connect the input carrier to the output carrier and are configured to transfer torque therebetween. Rotation of the input carrier relative to the output carrier places the first conical ring in compression and the second conical ring in tension.

In yet another embodiment, a torsion spring includes a first carrier configured to receive a torque. A second carrier is axially spaced from the first carrier and is configured to output a dampened torque. A pair of conical rings are connected to the first and second carriers. The rings cooperate to define a helical groove therein. A plurality of rolling elements are disposed in the helical groove. Rotation of the first carrier relative to the second carrier places one of the first or second rings in compression and the other of the first or second rings in tension

DETAILED DESCRIPTION

Figure 3:
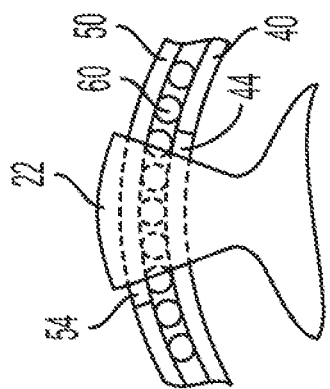
FIG. 3 is a partial front plan view of the portion of the damper of FIG. 2, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Torsion dampers are known in the art. For example, vehicles equipped with an internal combustion engine can have inherent undesirable vibrations or oscillations transferred to the crankshaft. Dampers are typically coupled (directly or indirectly) to the crankshaft to dampen those vibrations or oscillations before the torque is transmitted to a downstream transmission component (e.g., a gearbox, a motor, a clutch, a torque converter, etc.).

Typical torsion dampers utilize coiled springs arranged between plates or flanges. Torsion applied to an input flange of the damper causes displacement of the springs before the torsion or movement is transferred to the output flange. Torsional energy is stored by the damper in the springs when the forcing torque fluctuation is high and returned to the driveline when the forcing torque fluctuation is low.

A main challenge in torsion damper design is storing the most energy in the smallest volume. The springs explained above (e.g., helical compression springs) are well-proven but have several problems. For one, the springs need to contain their travel in the length of the spring. In other words, air exists between the spring wire to give room for the spring to compress. This wastes space in the spring volume. As another problem, helical springs stress the material in torsion by twisting the spring wire when the coils are compressed. This is not the most effective way to store energy.

Therefore, according to embodiments disclosed herein, a spring is disclosed that can be loaded in tension. For example, in embodiments described below, two conical rings with rolling elements in helical grooves therebetween are provided. The helical groove provides a helical threading for the rolling elements. The two rings can be loaded with tension and compression respectively as the conical rings are forced together by the threading motion provided as the rolling elements follow the helical thread.

Figure 2:
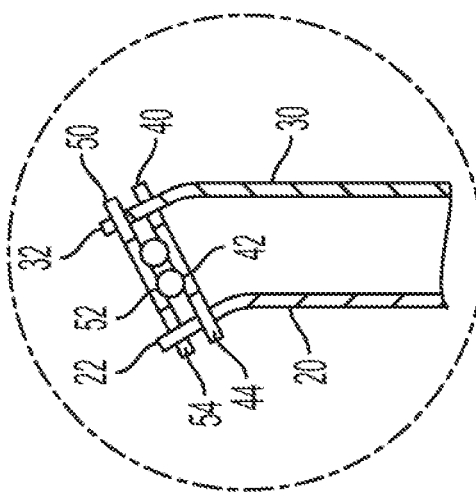
FIG. 2 is an enlarged view of a portion of FIG. 1 as indicated in the drawings, according to one embodiment.
Figure 1:
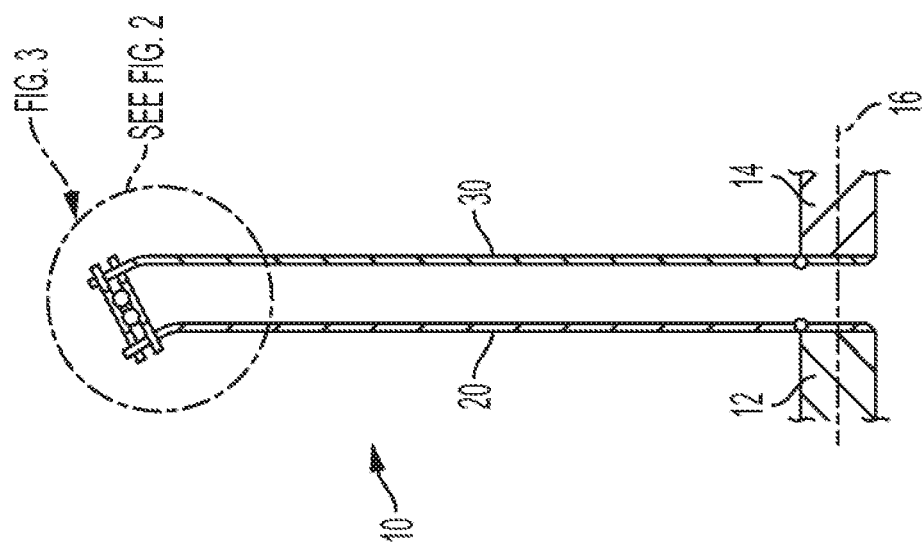
FIG. 1 is a top half of a cross-sectional view of a damper with a spring that utilizes tensile stresses to dampen vibrations, according to one embodiment.

FIG. 1 is a side cross-sectional view of a damper 10 with a spring that utilizes tensile stresses to isolate vibrations, according to one embodiment. FIG. 2 is an enlarged view of a portion of FIG. 1, highlighting the interaction of the two pendulum flanges via the conical rings and rolling elements. FIG. 3 is a partial front plan view of the damper (from the input side of the damper). These figures are merely examples of one potential embodiment of a spring utilizing tensile stress to isolate vibrations. The Figures are explained below in the context of a torsional vibration damper 10 used in a vehicle, but it should be understood that the teachings of the spring utilizing tensile stresses can be implemented in other areas of the vehicle depending on design needs.

The damper 10 can be a torsional vibration damper configured to dampen vibration as torque is transmitted from a prime mover (e.g., an internal combustion engine, traction motor, etc.) to a downstream transmission component (a gearbox, a motor, a clutch, a torque converter, etc.). As such, the damper 10 receives torque from an input shaft or input 12 that may be operative connected to the prime mover (e.g., via a crankshaft), and an output shaft or output 14 that may be operatively connected to the downstream transmission component. The input 12 and output 14 may be coaxial along a center axis 16, but may be only indirectly connected to one another through the damper 10. For simplicity, it should be understood that FIG. 1 only shows the portion of the components above the center axis 16, and that these components continue beneath the center axis as well.

The damper 10 includes a first carrier 20 and a second carrier 30. The carriers can also be referred to as plates, flanges, and other similar terms that are used in association with previous dampers that would oscillate and be connected to helical springs. The first carrier 20 may also be referred to as an input carrier as it is connected to the input 12 and receives torque directly therefrom. Likewise, the second carrier 30 may be referred to as an output carrier as it is connected to the output 14 and delivers torque directly thereto.

The carriers 20, 30 may be fixed to the input 12 and output 14, respectively, in a non-rotatable fashion such that the carrier 20 rotates with the input 12 and the carrier 30 rotates with the output 14. This can include welding or other permanent fixing methods. In other embodiments, the carriers 20, 30 are formed as integral extensions of the input and output, respectively.

The first carrier 20 has a tab 22 which is a bent portion extending from the first carrier 20 at an angle toward the input. Likewise, the second carrier 30 has a tab 32 extending therefrom that is parallel to the bent portion 22. While the tabs 22, 32 are shown to extend toward the input (e.g., to the left in FIGS. 1-2), in another embodiment the bent portions 22, 32 extend toward the output. As shown in FIG. 3, the bent portions 22, 32 may also be tapered radially inwardly.

The damper 10 also has a pair of concentric conical or cone-shaped rings, namely a first ring 40 and a second ring 50. The rings 40, 50 are both tapered to take a cone shape. The first ring 40 is located radially inward from the second ring 50.

A plurality of rolling elements 60 reside between the first ring 40 and the second ring 50. The rolling elements 60 can be spherical, cylindrical, or other suitable shapes. The first ring 40 and the second ring 50 cooperate to define a helical groove therebetween to accommodate and house the rolling elements 60. For example, the first ring 40 may include a first set of surface features 42 on a radially-outward surface, such as grooves, slots, etc. Likewise, the second ring 50 may include a second set of surface features 52 on a radially-inward surface thereof. The surface features on each ring can be continuous such that a continuous groove in a helical shape is provided. The continuous helical groove between the first ring 40 and the second ring 50 can contain the rolling elements 60 arranged in a continuous helical shape between the rings 40, 50. In other words, the helical grooves for the rolling elements 60 can act as a screw thread.

Torque is carried onto the rings 40, 50 by the carriers 20, 30 respectively. In particular, the rings 40, 50 may each have tabs or protuberances that engage the tabs 22, 32 of the carriers 20, 30. For example, as shown in FIG. 3, the tab 22 of the first carrier 20 is shown resting between two tabs or protuberances extending from the rings 40, 50; the first ring 40 has a protuberance 44 extending normal to the tab 22, and the second ring 50 has a protuberance 54 extending normal to the tab 22. The tab 22 engages the protuberance 44 when the carrier 20 rotates clockwise (in the view shown in FIG. 3), and the tab 22 engages the protuberance 54 when the carrier 20 rotates counter-clockwise.

While protuberances 44, 54 are shown as engaging the tab 22 of the input carrier 20 in FIG. 3, it should be understood that the output carrier can also engage corresponding tabs in the first and second rings 40, 50. This is shown in FIG. 2.

Torque or movement is dampened as it transfers through the damper 10 as follows. Engine torque is received by the input carrier, turning in clockwise orientation in FIG. 3. This presses the first ring 40 clockwise via engagement with the tab 44. As the first ring 40 is rotated clockwise, the torque transfers through the rolling elements 60 and into the second ring 50. This causes a screwing action between the first and second rings 40, 50 due to their cone shape. This would also push on the second carrier 30 to rotate with the first carrier 20 although after dampening is performed through the damper 10 via the screwing action between the first and second rings 40, 50. During this, the first ring 40 would be in compression and the second ring 50 would be in tension.

When torque is reversed (such as when the vehicle is coasting down a hill), the torque may be sent from the output carrier 30 to first ring 40 via corresponding tabs. The torque then transfers through the rolling elements into the second ring 50, which presses upon the tab 22 via protuberance 54 to force the input carrier 20 to rotate clockwise. This may wind the prime mover with negative torque, for example.

In the counter-clockwise direction, the input carrier 20 engages the second ring 50 via an interface with protuberance 54. A similar relationship is provided with the output carrier 30 and the first ring 40. This allows the damper to dampen vibration in both rotational directions.

Prior art dampers with helical springs stress the material of the spring in torsion when the wire twists during compression of the spring. In contrast, the spring explained in this disclosure utilizes tension which can be up to three times more space-efficient for energy storage. This reduces the overall dimensions and size of the accommodating device (e.g., damper).

While the above embodiments disclose rolling elements between two rings, there are other arrangements which can be used, such as leaf springs or a spline connection.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 damper
12 input
14 output
16 axis
20 input carrier
22 tab
30 output carrier
32 tab
40 first conical ring
42 surface feature
44 protuberance
50 second conical ring
52 surface feature
54 protuberance
60 rolling elements

What is claimed is:

1. A torsion damper comprising:
an input carrier configured to rotate about an axis and receive an input torque from a prime mover;
an output carrier spaced along the axis from the input carrier and configured to transfer an output torque to a transmission component;
a first ring connected to the input carrier;
a second ring connected to the output carrier and spaced apart from the first ring; and
a plurality of rolling elements disposed between and connecting the first and second rings, wherein rotation of the input carrier relative to the output carrier forces the first ring to be in compression and the second ring to be in tension, wherein the first and second rings are conical relative to the axis.

2. The torsion damper of claim 1, wherein
the first ring has a first surface facing the second ring, the first surface defining a first groove,
the second ring has a second surface facing the first ring, the second surface defining a second groove, and
the rolling elements are disposed within the first and second grooves.

3. The torsion damper of claim 2, wherein the first groove is a single helical groove extending entirely about the axis and the second groove is a single helical groove extending about the axis.

4. The torsion damper of claim 3, wherein rotation of the input carrier relative to the output forces the first ring to move relative to the second ring.

5. The torsion damper of claim 3, wherein rotation of the input carrier relative to the output carrier forces the rolling elements to travel along the first and second grooves.

6. The torsion damper of claim 1, wherein the input carrier is an input plate, and the output carrier is an output plate.

7. The torsion damper of claim 1, wherein the input carrier has a tab, the first ring has a first protuberance engaging one side of the tab, and the second ring has a second protuberance engaging another side of the tab.

8. A torsion damper comprising:
an input carrier configured to rotate about an axis and receive an input torque from a prime mover;
an output carrier spaced along the axis from the input carrier and configured to transfer an output torque to a transmission component; and
first and second conical rings connecting the input carrier to the output carrier and configured to transfer torque therebetween;
wherein rotation of the input carrier relative to the output carrier places the first conical ring in compression and the second conical ring in tension.

9. The torsion damper of claim 8, wherein the first and second conical rings cooperate to define a helical groove extending about the axis.

10. The torsion damper of claim 9, further comprising a plurality of rolling elements located within the helical groove, wherein the rotation of the input carrier relative to the output carrier forces the rolling elements to move along the helical groove.

11. The torsion damper of claim 9, wherein the first conical ring defines a first groove surface, and the second conical ring defines a second groove surface facing the first groove surface, and wherein the first and second groove surfaces collectively define the helical groove.

12. The torsion damper of claim 8, wherein
the first conical ring has a first protuberance extending toward the input carrier,
the second conical ring has a second protuberance extending toward the input carrier, and
the input carrier has a tab located circumferentially between the first protuberance and the second protuberance.

13. The torsion damper of claim 12, wherein
the tab contacts the first protuberance when the input carrier is rotated in a first direction to force the first conical ring in the first direction, and
the tab contacts the second protuberance when the input carrier is rotated in a second direction to force the second conical ring in the second direction.

14. The torsion damper of claim 12, wherein
the first conical ring has a third protuberance extending toward the output carrier,
the second conical ring has a fourth protuberance extending toward the output carrier, and
the output carrier has a tab located circumferentially between the third protuberance and the fourth protuberance, wherein the third protuberance and forth protuberance are configured to contact the tab of the output carrier for transmitting torque through the torsion damper.

15. A torsion spring comprising:
a first carrier configured to receive a torque;
a second carrier axially spaced from the first carrier and configured to output a dampened torque;
first and second conical rings connected to the first and second carriers, the rings cooperating to define a helical groove therein; and
a plurality of rolling elements disposed in the helical groove;

wherein rotation of the first carrier relative to the second carrier places one of the first or second rings in compression and another of the first or second rings in tension.

16. The torsion spring of claim 15, wherein the first carrier is an input plate configured to receive engine torque, and the second carrier is an output plate configured to transfer a dampened engine torque to a transmission component.

17. The torsion spring of claim 15, wherein the first conical ring includes a first protuberance extending toward the first carrier that engages with the first carrier during rotation in a first direction.

18. The torsion spring of claim 17, wherein the second conical ring includes a second protuberance extending toward the first carrier that engages with the first carrier during rotation in a second direction.

19. The torsion spring of claim 18, wherein the first carrier has a tab located circumferentially between the first and second protuberances.

* * * * *